United States Patent
Kronander et al.

(10) Patent No.: US 10,136,436 B2
(45) Date of Patent: Nov. 20, 2018

(54) METHODS AND DEVICES FOR SCHEDULING OF RADIO COMMUNICATION

(71) Applicant: Telefonaktiebolaget LM Ericsson (publ), Stockholm (SE)

(72) Inventors: Jonas Kronander, Knivsta (SE); Robert Baldemair, Solna (SE); Virgile Garcia, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/526,793

(22) PCT Filed: Dec. 19, 2014

(86) PCT No.: PCT/SE2014/051544
§ 371 (c)(1),
(2) Date: May 15, 2017

(87) PCT Pub. No.: WO2016/099359
PCT Pub. Date: Jun. 23, 2016

(65) Prior Publication Data
US 2017/0332380 A1    Nov. 16, 2017

(51) Int. Cl.
*H04W 72/04*    (2009.01)
*H04W 8/00*    (2009.01)
*H04W 72/08*    (2009.01)

(52) U.S. Cl.
CPC ....... *H04W 72/0453* (2013.01); *H04W 8/005* (2013.01); *H04W 72/085* (2013.01)

(58) Field of Classification Search
CPC ....... H04L 47/70; H04L 47/822; H04L 65/80; H04L 29/06027; H04L 47/10;
(Continued)

(56) References Cited

U.S. PATENT DOCUMENTS

| | | | |
|---|---|---|---|
| 2003/0078050 A1* | 4/2003 | Carlborg | H04W 28/26 455/452.1 |
| 2007/0091825 A1* | 4/2007 | Budampati | H04B 1/713 370/255 |

(Continued)

FOREIGN PATENT DOCUMENTS

WO    2012044627 A1    4/2012

OTHER PUBLICATIONS

Merlin, S. et al., "Methods for improving medium reuse in IEEE 802.11 networks", Consumer Communications and Networking Conference, Jan. 10, 2009, pp. 1-5, IEEE.
(Continued)

*Primary Examiner* — Nizar Sivji
(74) *Attorney, Agent, or Firm* — Patent Portfolio Builders, PLLC

(57) ABSTRACT

There is provided a method for operating a wireless device in order to determine whether to include information relating to reservations of communication resources when planning scheduling of upcoming communications. There is also provided a method performed by a wireless device for transmitting a resource reservation message that comprises information about the identity of the intended recipient. There is also provided corresponding wireless devices and computer programs and computer program products. The proposed technology provides mechanisms that enable a wireless device to take into consideration information relevant for planning scheduling of future communications.

30 Claims, 11 Drawing Sheets

(58) Field of Classification Search
CPC . H04L 47/805; H04L 45/302; H04L 65/1026; H04L 65/1036; H04L 69/32; H04Q 2011/0086; H04Q 2011/0084; H04W 16/14; H04W 28/26; H04W 16/16; H04W 28/18; H04W 36/0055; H04W 72/082; H04W 84/00; H04W 72/0453; H04W 72/085; H04W 8/005; G06F 11/07; G06F 2209/5014
See application file for complete search history.

(56) References Cited

U.S. PATENT DOCUMENTS

| | | | |
|---|---|---|---|
| 2012/0099450 A1* | 4/2012 | Madan | H04W 74/0816 370/252 |
| 2013/0058218 A1 | 3/2013 | Wu et al. | |
| 2013/0235737 A1 | 9/2013 | Merlin et al. | |
| 2015/0201401 A1* | 7/2015 | Lahetkangas | H04L 1/0079 370/329 |
| 2017/0013645 A1* | 1/2017 | Choi | H04W 74/0816 |
| 2017/0048879 A1* | 2/2017 | Zhang | H04W 72/12 |
| 2017/0280377 A1* | 9/2017 | Patil | H04W 48/16 |
| 2018/0124813 A1* | 5/2018 | Li | H04W 72/1263 |

OTHER PUBLICATIONS

Garg, S. et al., "MAC Scheduling Policies for Power Optimization in Bluetooth: A Master Driven TDD Wireless System", IEEE 51st Vehicular Technology Conference Proceedings, May 15-18, 2000, pp. 196-200, IEEE.

* cited by examiner

FIG. 3A
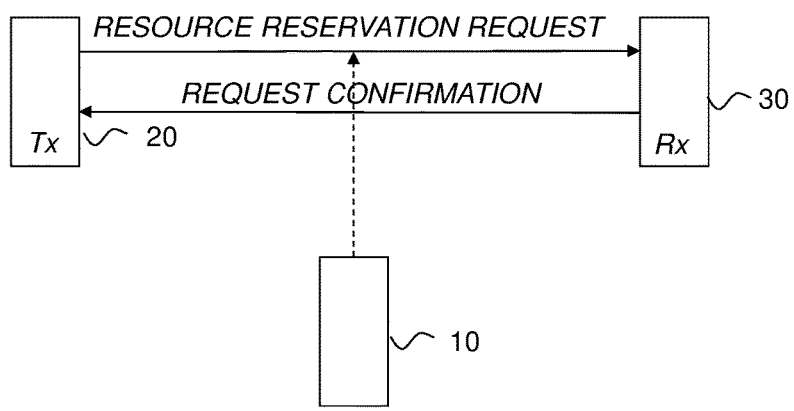
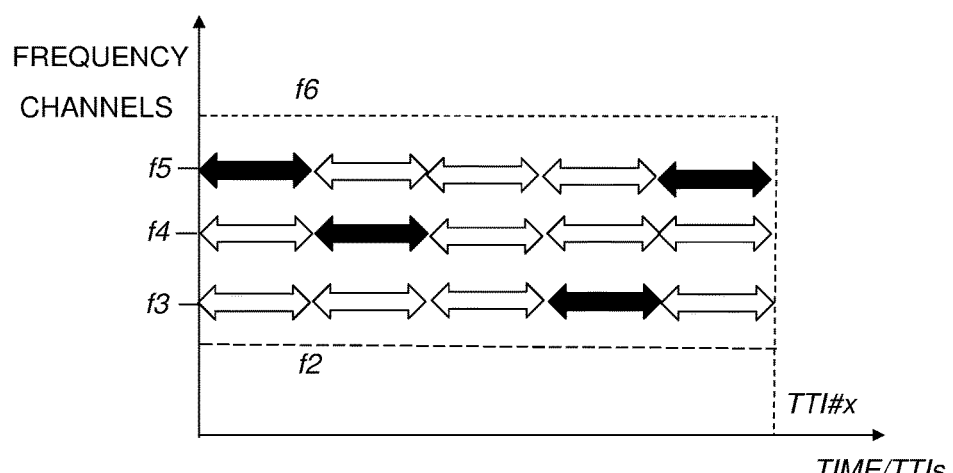
FIG. 3B

METHODS AND DEVICES FOR SCHEDULING OF RADIO COMMUNICATION

TECHNICAL FIELD

The proposed technology generally relates to a method for operating a wireless device and a method for transmitting a resource reservation message. The proposed technology also provides corresponding wireless devices and computer programs along with a computer program product.

BACKGROUND

There is an ever increasing demand for faster and more robust broadband data transmissions within the field of wireless networks. The radio frequency resources that can be used are however limited. In order to provide an efficient use of the resources, and some degree of fairness between the wireless devices served by the network, some network utilize procedures of reservation and scheduling of radio transmissions. In these procedures wireless devices within the network negotiates about existing resources and they are allowed to reserve resources for future transmissions. It is beneficial to the data-throughput in the network if wireless devices are provided with communication scheduling that can ascertain that the communications, i.e. the sending and receiving of data, are appropriately planned in order to at least reduce the number of re-transmissions. Having to retransmit messages and data depletes the system resources and will negatively affect the system through-put.

To be able to further increase the data throughputs in general networks mechanisms that can improve the reservation and scheduling procedure are of significant value.

A particular way to respond to the increasing demand for mobile broadband, MBB, data has also resulted in proposals of using new spectrum bands for transmission. New radio access technologies, RATs, are currently being investigated and developed for operating in higher frequency bands, i.e., in frequency bands above 6 GHz. In particular RATs designed to operate somewhere in the range 10-60 GHz are being developed. This frequency band is commonly referred to as the millimeter wave band, mmW band. The higher frequency bands impose new requirements on the RAT stemming from the radio propagation characteristics of the bands. Higher frequencies require high gain beamforming and imply higher path and penetration losses than experienced at lower frequencies, e.g., around 2 GHz. Hence there is also a need for finding mechanisms that can at least counter losses like these and act to improve the data throughput for networks susceptible to such losses.

There is therefore a general demand to at least provide improvements for handling of radio resource in order to increase the data-throughput in a network.

SUMMARY

It is an overall objective to provide a mechanism that enables an improved usage of the rather limited resources provided by the radio-frequency spectrum.

It is a particular object to provide support for efficient use of scheduling information It is an object to provide a method for operating a wireless device to provide support for efficient use of scheduling information It is another object to provide a method, performed by a wireless device for transmitting resource reservation messages.

A further object is to provide a wireless device configured to provide support for efficient use of scheduling information.

Yet another object is to provide a wireless device configured to transmit resource reservation messages.

Still another object is to provide corresponding computer programs and computer program products.

This and other objects are met by embodiments of the proposed technology.

According to a first aspect, there is provided a method for operating a wireless device, the method comprises the step of decoding a resource reservation message received on communication channel used for resource reservation negotiations, the received message comprising information relating to reservations of communication resources between a transmitting wireless device and a recipient. The method also comprises the step of obtaining a measure of a signal characteristic of the received message. The method also comprises the step of determining if the obtained measure fulfills a specified criterion and the step of deciding, based on whether the obtained measure fulfilled the specified criterion, whether to include the information relating to reservations of communication resources when planning scheduling of upcoming communications.

According to a second aspect of the proposed technology there is provided a method performed by a wireless device, configured to work in a wireless communication system, for transmitting resource reservation messages, the method comprises the step of creating a resource reservation message comprising a request to reserve communication resources for an upcoming transmission. The method also comprises the step of adding, to the resource reservation message, information identifying the intended receiver of the resource reservation message to enable a third party overhearing the message to use the information comprised in the resource reservation message when planning scheduling of upcoming communications. The method also comprises the step of transmitting the resource reservation message with the included information identifying the intended receiver over a communication channel used for resource reservation negotiations.

According to a third aspect of the proposed technology there is provided a wireless device configured to work in a wireless communication network. The wireless device is configured to decode a message received on a communication channel used for resource reservation negotiations, the received message comprising information relating to reservations of communication resources to be used between a transmitting wireless device and an intended recipient. The wireless device is also configured to obtaining a measure of a signal characteristic of the received message. The wireless device is also configured to determine if the obtained measure fulfills a specified criterion. The wireless device is further configured to decide, based on whether the obtained measure fulfilled the specified criterion, whether to include the information relating to reservations of communication resources when planning scheduling of upcoming communications.

According to a fourth aspect of the proposed technology there is provided a wireless device configured to work in a wireless communication network. The wireless device is configured to create a resource reservation message comprising a request to reserve communication resources for an upcoming transmission. The wireless device is also configured to add, to the resource reservation request message, information identifying the intended recipient of the resource reservation request message to enable a third party to use the content of the message when planning scheduling of upcoming communications. The wireless device is further configured to transmit the resource reservation message with the included information identifying the intended recipient over a communication channel used for resource reservation negotiations.

According to a fifth aspect of the proposed technology there is provided a computer program comprising instructions, which when executed by at least one processor, cause the at least one processor to:
  decode a message received on a communication channel used for resource reservation negotiations, the received message comprising information relating to reservations of communication resources to be used between a transmitting wireless device and an intended recipient;
  obtain a measure of a signal characteristic of the received message;
  determine if the obtained measure fulfills a specified criterion;
  decide, based on the comparison of the obtained measure with the specified criterion, whether to include information relating to the reservations of communication resources when planning scheduling of upcoming communications.

According to a sixth aspect of the proposed technology there is provided a computer program comprising instructions, which when executed by at least one processor, cause the at least one processor to:
  create a resource reservation message comprising a request to reserve resources for an upcoming transmission; and
  add, to the resource reservation message, information identifying the intended recipient of the resource reservation request message to enable a third party to use the content of the message when scheduling upcoming communications to thereby enable a resource reservation message with the included information identifying the intended recipient to be transmitted over a communication channel used for resource reservation negotiations.

According to a seventh aspect of the proposed technology there is provided a computer program product comprising a computer-readable storage medium having stored thereon the computer program of the fifth or sixth aspect.

Embodiments of the proposed technology provides particular mechanisms whereby the data throughput in a system can be improved. Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 3a is a signaling diagram illustrating the procedure of reserving resources for future communications.

FIG. 3B is a schematic time-frequency diagram that illustrates reserved resources for future communications.

DETAILED DESCRIPTION

Throughout the drawings, the same reference designations are used for similar or corresponding elements.

Figure 1:
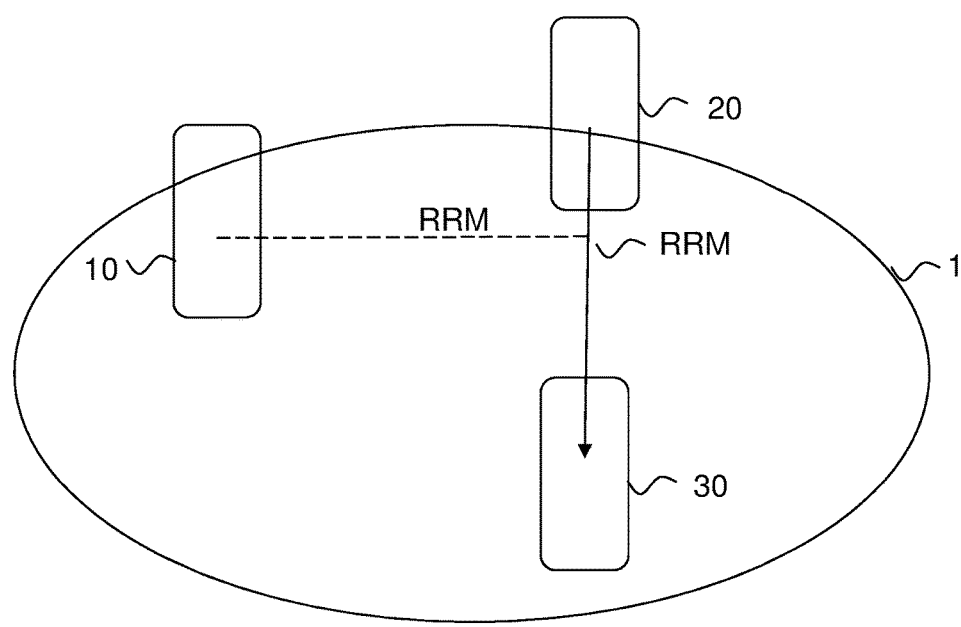
FIG. 1 is a schematic illustration showing a radio network comprising three wireless devices.

For a better understanding of the proposed technology, it may be useful to begin with a brief overview of the proposed technology. FIG. 1 provides a simplified view of a radio communication network 1 schematically comprising three different wireless devices 10, 20 and 30. The network will in general host a large number of wireless devices but three wireless devices will suffice to describe the main features relevant for the proposed technology.

As can be inferred from FIG. 1 a transmitting wireless device 20 transmits a resource reservation message, denoted RRM in the figure, to an intended recipient that correspond to wireless device 30. A resource reservation message, or a radio resource reservation message since it refers to reservation of radio resources, is a message that is used for negotiating particular communication resources, such as radio communication resources, to be used between two communicating devices within the communication network. That is, a message where one wireless device suggest to another wireless device that they should reserve resources between them for a future or upcoming communication. Such a message might, for example, be a message where a transmitting device proposes to a receiving device that it will perform a transmission to the receiving device at, for example, a particular time/timeslot and at a particular frequency/frequency band/subcarrier and thus suggest that the receiving device should listen to those resources in order to be able to receive the transmission. The content in the resource reservation message that relates to the proposed resources are in what follows referred to as communication resources.

Figure 2:
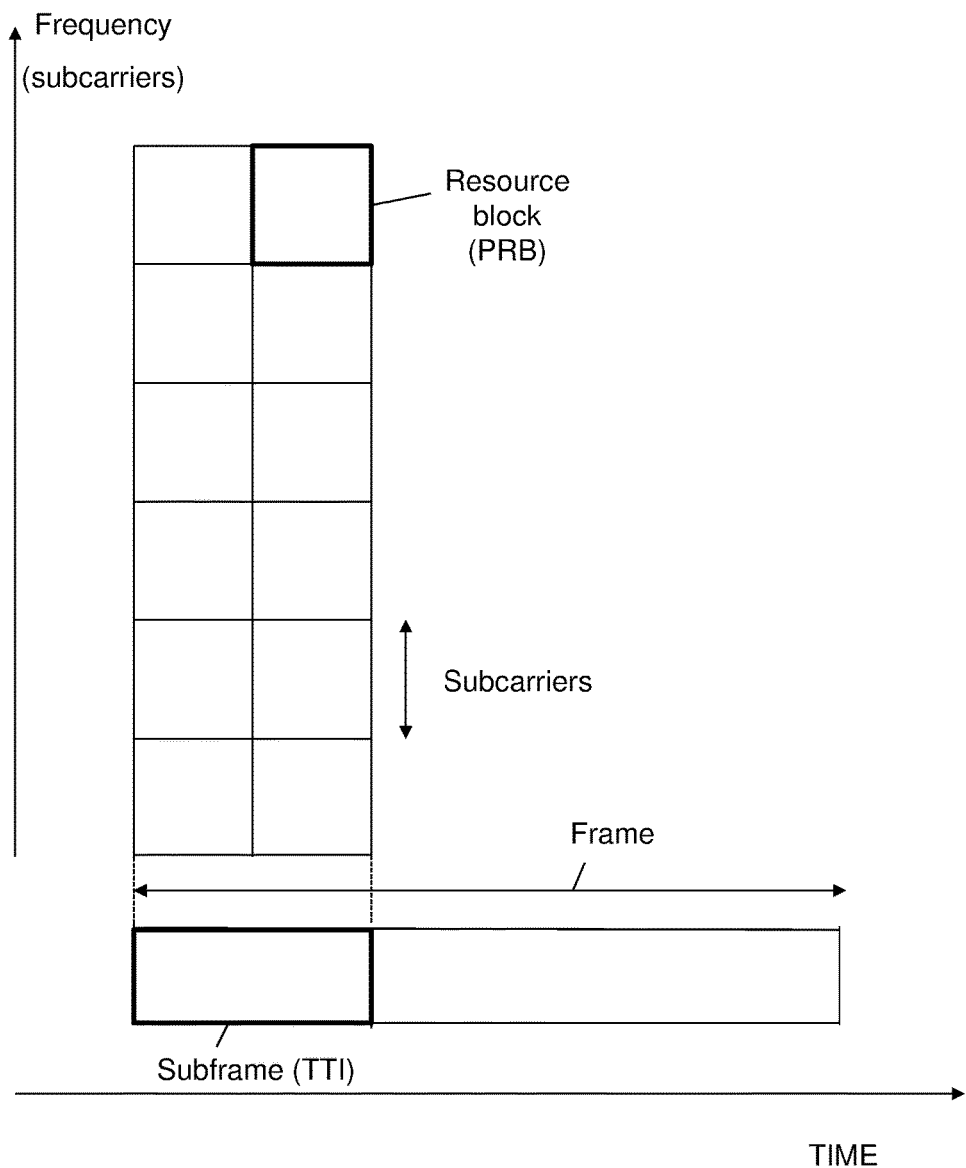
FIG. 2 is a schematic illustration of a particular time-frequency diagram that illustrates communication resources.
Figure 4:
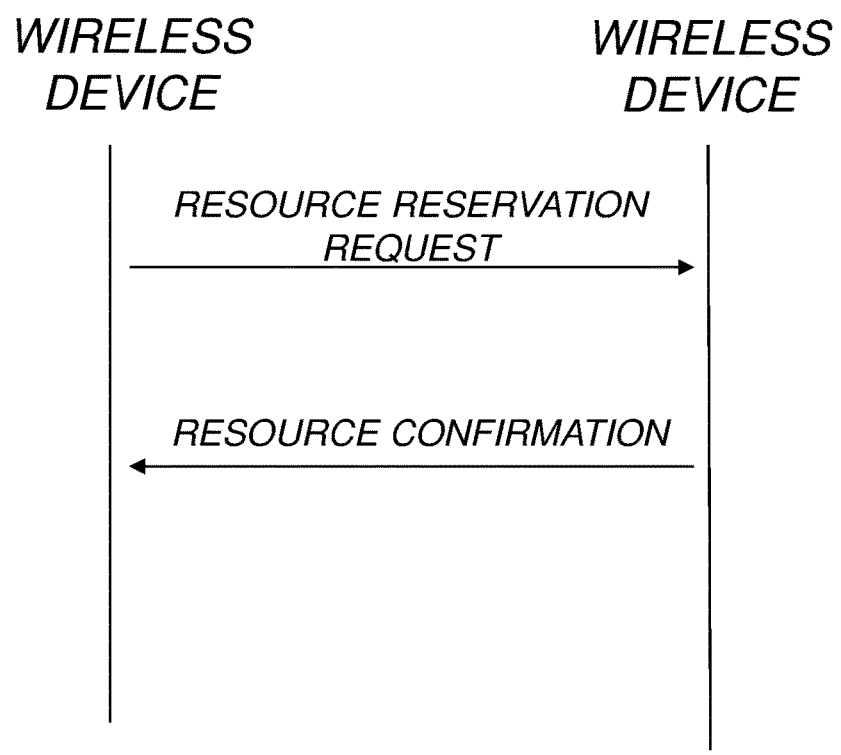
FIG. 4 is a signaling diagram that illustrates the signaling between two different wireless devices in order to reserve communication resources.

To further facilitate the understanding of the proposed technology it may be useful to provide examples of communication resources. FIG. 2 is a schematic time-frequency diagram illustrating an example of time-frequency resources for radio transmissions. In the time domain a frame may include a number of subframes, where each subframe optionally may include one or several time slots. A subframe corresponds to a Time Transmission Interval, TTI. A resource block, which can be referred to as a Physical Resource Block, PRB, may for example include a number of subcarriers in the frequency domain. The resource blocks are distributed in the frequency domain over a predetermined bandwidth. The resource blocks are normally assigned in pairs per subframe in the time domain. To be specific, in Long Term Evolution, LTE, one frame is 10 ms and includes 10 subframes. One subframe is 1 ms long and includes two slots of length 0.5 ms. In the frequency domain a number of resource blocks can be assigned where the number depends on the availability of resources and bandwidth allocation. It should be emphasized that this only provides a particular example relating to LTE and the communication resources of the proposed technology may have other concrete designs. The important feature is that the content of the resource reservation message provides distinct information that enables a wireless device decoding the message to extract information that pinpoints the proposed communication resource.

FIG. 3B provides another schematic illustration of a particular case of communication resources that corresponds to frequency channels and transmission time intervals. In the graph of FIG. 3B black arrows corresponds to reserved resources and white arrows to non-reserved resources. The graph illustrates a number of frequency channels, f2-f6, and a number of TTIs. The length of the arrows corresponds to a number of TTIs, or equivalently to a time span, and the position of the arrow on the y-axis corresponds to a particular frequency channel. As a specific example illustrating reservation of communication resources, the frequency channel f5 in the graph is reserved for the first TTIs, while the frequency channels f3 and f4 are non-reserved communication resources during the same first TTIs. In the next few TTIs the frequency channel f4 is reserved while the frequency channels f5 and f3 is non-reserved communication resources. In this particular case a resource reservation message might contain a proposal that the receiving wireless device should allocate resources for receiving data at a particular frequency channel at specified TTIs.

The resource reservation message, RRM, is usually transmitted on a communication channel, such as a radio communication channel, that can be used for resource negotiations or is even dedicated to conveying this type of messages. It may in particular be transmitted on a specified frequency known to all wireless devices within the network. Such a communication channel could be a region in the time-frequency plane, e.g. some resource block a depicted in FIG. 2. A specific example of this could be a resource block extending in frequency but only one or a few resource blocks in time. As an alternative, it could be one or a few resource blocks in frequency domain but span longer in time.

In FIG. 1 there is also shown a wireless device 10. The wireless device 10 is able to decode the resource reservation message transmitted on the communication channel used for resource negotiations. This is schematically illustrated by the dotted line. The signaling between the three wireless devices is also schematically illustrated in the signaling diagram of FIG. 3A. Here a transmitting wireless device 20 sends, over the radio interface, a resource reservation message with the intended recipient the receiving wireless device 30. This message is sent in order to start a negotiation about communication resources to be used when the wireless device 20 transmits data to the wireless device 30. The resource reservation messages are usually transmitted in such a way that they provide sufficient coverage and can reach the receiving wireless device 30, as well as neighboring wireless devices so they can clear the channel from transmissions. Thus, by design, the resource reservation message will be overheard by several wireless devices that will agree on who is allowed to transmit at a given time, reducing the spectral reuse for better channel quality. In other words, the resource reservation message is transmitted on a communication channel that is used for resource negotiations and the messages sent over this channel can also be received and decoded by any other nearby wireless devices, here represented by the a wireless device 10. A wireless device 10 is thus able to obtain the information comprised in the resource reservation message and the information can then be used when scheduling the wireless device 10 upcoming transmissions. Based on the obtained information, which form part of the wireless device local view of communication resource utilisation the wireless device is able to plan upcoming communication transmissions in such a way that the communication can be expected to be successful. That is, it will be possible to provide the wireless device 10 with a scheduling of communications that at least reduce the risk of interfering disturbances due to the fact that other wireless devices within the network performs communication transmission over the same communication resources, e.g. at the same time and the same frequency.

Upon receiving the resource reservation request by means of the resource reservation message, the intended recipient of the message, which in FIG. 3A is the wireless device 20, can decide whether to confirm the resource reservation. This is in general performed by means of a resource confirmation message, RC message. Thus a received resource reservation message triggers the intended recipient to decide whether the proposal from the transmitting wireless device will be accepted, leading to a reply by means of a RC message, or rejected, e.g. by not transmitting any reply to the resource reservation message. The response may be based on the intended recipient's local view of the communication resource utilization.

The proposed technology aims to provide a more fine grained approach of extracting and using information carried by a resource reservation message transmitted over a communication channel. By providing a mechanism whereby the information that is most relevant for a particular wireless device is extracted from the large amount of overheard and decoded messages it will be possible to improve the scheduling of the wireless device upcoming communications. In turn, by improving the scheduling for wireless devices within a network the data through-put, given in for example bits per second, bps, of the network will increase.

The proposed technology provides, in broad terms, such a mechanism by introducing certain criteria that shall be fulfilled before the information in the resource reservation message is included in the local view of communication resource utilization that can be used to plan and schedule upcoming communications. The scheduling of the future communications may be performed by the wireless device itself. A wireless device such as, for example, a User Equipment or an eNodeB in an LTE-network, an access node or a relay, may be configured to perform its own scheduling based at least partially on the information that can be obtained by the proposed technology. This might be preferable if a more distributed operation is wanted, that is, in a radio technology where certain operations are distributed between the various nodes within the network. Alternatively the obtained information may be relayed to a supporting device that provides scheduling for the wireless device. The proposed technology provides a mechanism whereby it will be possible to extract relevant information that enables improved scheduling.

The proposed technology provides distinct advantages in propagation environments and applications that allows pencil narrow beamforming. The use of pencil beamforming enables an aggressive spatial reuse of the communication resources. The inventors have found that using the information of all overheard resource reservations messages might lead to a suboptimal spatial reuse of the communication resources.

Figure 5:
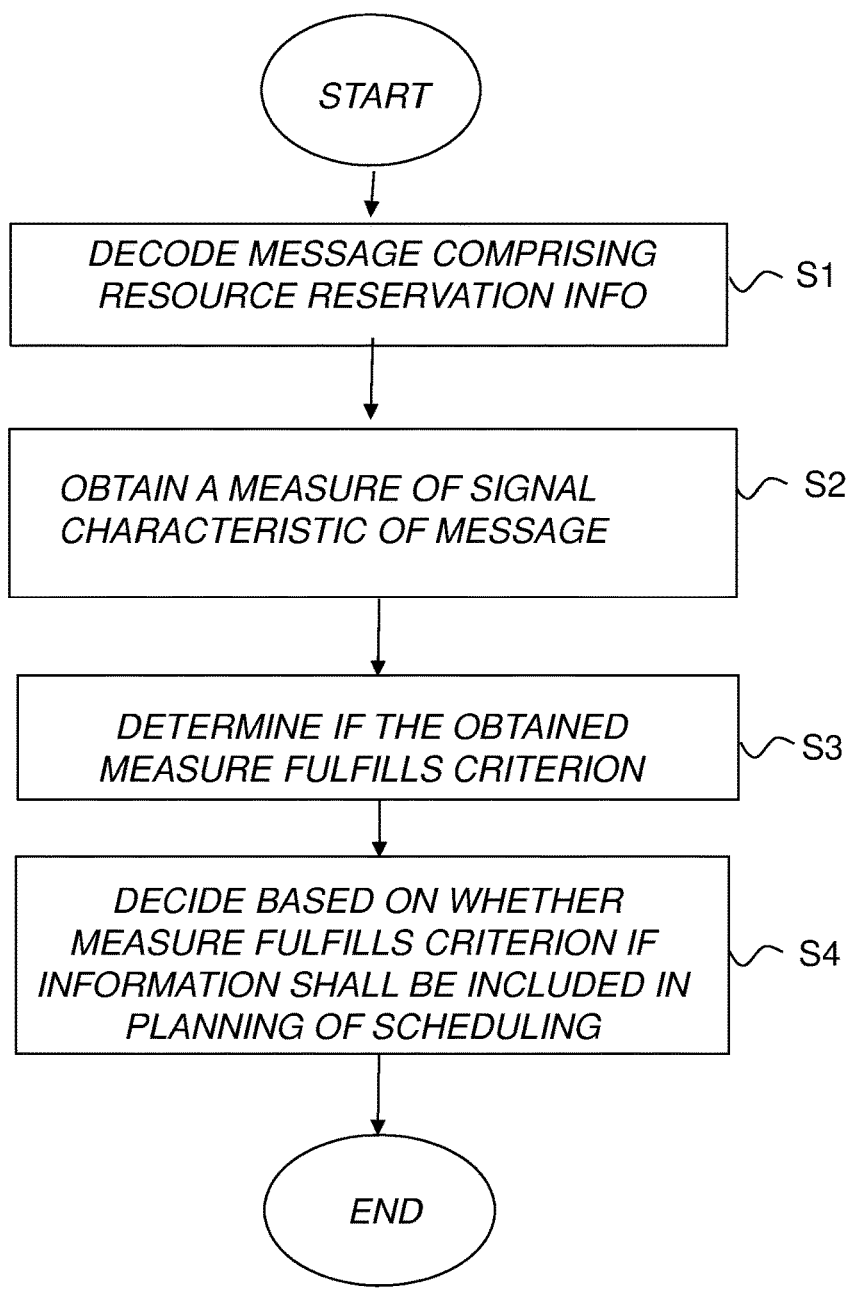
FIG. 5 is a flow diagram illustrating an embodiment of method for operating a wireless device according to the proposed technology.
Figure 6:
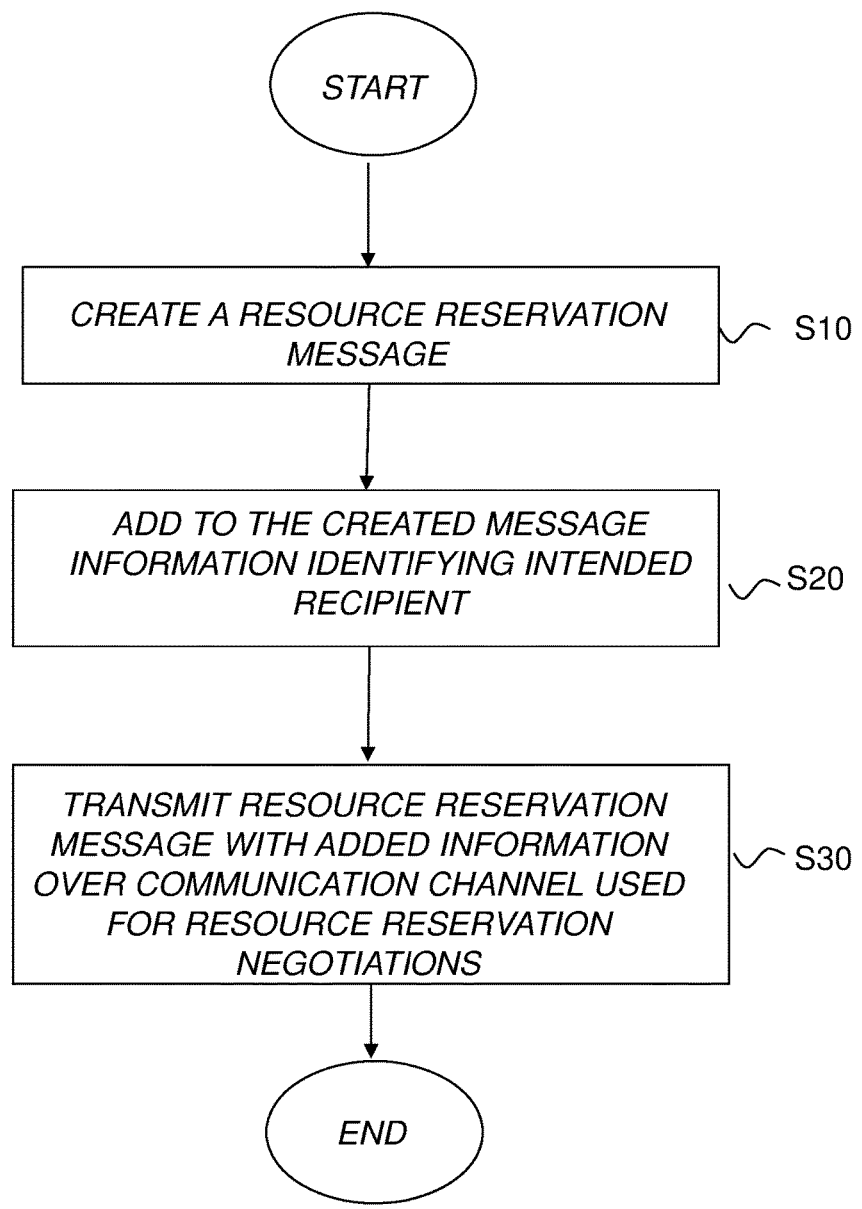
FIG. 6 is a flow diagram illustrating an embodiment of a method for transmitting resource reservation messages according to the proposed technology.

There is therefore provided a method for operating a wireless device. The method comprises the step of decoding S1 a resource reservation message received on a communication channel used for resource reservation negotiations, the received message comprising information relating to reservations of communication resources between a transmitting wireless device and a recipient. The method also comprises the step of obtaining S2 a measure of a signal characteristic of the received message. The method also comprises the step of determining S3 if the obtained measure fulfills a specified criterion. The method also comprises the step of deciding S4, based on whether the obtained measure fulfilled the specified criterion, whether to include the information relating to reservations of communication resources when planning scheduling of upcoming communications. The method is schematically illustrated in the diagram of FIG. 5.

Stated slightly different, the proposed technology provides a method that enables a wireless device to extract, from received resource reservation messages, the information that is most relevant with regard to the wireless device scheduling of its own future communications. As such the method comprises to decode a resource reservation message. The decoded message was received over a communication channel used for resource reservation negotiations. The received message comprises information that relates to proposed reservations of communication resources. These communication resources in turn specify the communication resources that are proposed to be used on, e.g. a particular communication link or a particular radio communication link between a transmitting wireless device and a recipient. The method also comprises to obtain a measure of a signal characteristic of the received message that is decoded. Explicit measures and signal characteristics that could be used will be described in more detail in what follows. The method also comprises to determine whether the obtained measure fulfills a specified criterion. The specific criterion used depends on, or are related to, the type of measure of signal characteristics that is obtained. Various alternatives will be described in what follows. The method also comprises the step of deciding whether to include the information relating to reservations of communication resources when planning scheduling of upcoming or future communications. The outcome of the decision is based on whether the obtained measure fulfilled the specified criterion.

By designing a particular criterion the method will provide a way that enables a wireless device to extract from received and decoded resource reservation messages the information carried by a message that fulfills the specified criterion. It will therefore be possible, by choosing a particular criterion and a corresponding measure, to extract the messages containing the most relevant information for the planning of scheduling of upcoming communications such as transmitting data or receiving data.

The criterion and measure used in the method could for example be chosen in order to ensure that relevant information is obtained for cases where there are propagation environment characteristics that might affect future radio communications or where there is a lot of interference in the radio environment. In the latter case the criterion and measure might for example be set to ensure that information is extracted only from those messages that emanates from a transmitting wireless device that transmits at high enough signal power or is received with high enough signal power. In this way it will be possible to include information about potentially interfering transmissions in the planning of scheduling of upcoming communications. Other possibilities will be described in more detailed embodiments.

In a particular embodiment of the proposed method the information relating to reservations of communication resources to be used between a transmitting wireless device and an intended receiving wireless device comprises information relating to reservations of time and frequency resources. In other words, the resource reservation message comprises proposed time and frequency resources. Particular examples of such time and frequency resources were described with relation to FIG. 3B and FIG. 2.

Still another embodiment of a method according to the proposed technology provides a method that also comprises to establish whether the wireless device was the intended recipient of the resource reservation message, and only perform the step S3 of determining if the obtained measure fulfills a specified criterion if it is established that the wireless device was not the intended recipient of the message.

By providing a method that ensures that the received resource reservation message was not intended for the wireless device the wireless device can perform the step of determining if the obtained measure fulfills a specified criterion only for those messages that relates to communications between other wireless devices within the network. It also ensures that received requests for resource reservations that are aimed at the wireless device will be properly handled according to common protocol and not thrown away due to not fulfilling the criterion. This particular embodiment thus provides a method where only those messages that are overheard are considered as potential information carrying messages whose content might be useful for planning scheduling of upcoming communications.

Yet another embodiment of the proposed technology provides a method wherein it is established whether the wireless device was the intended recipient of the received message, in the case that resource reservation message is a message requesting a resource reservation, based on information identifying the intended recipient of the message where the information is contained in the received message. That is, by utilizing information in the resource reservation message that identifies the intended recipient of the message it will be possible for the wireless device to straightforwardly extract only those messages that were overheard over the communication channel and not aimed at itself.

In still another embodiment of the proposed technology there is provided a method, wherein the step S2 of obtaining a measure of a signal characteristic comprises to obtain a measure of the received signal power of the received message. In other words, the wireless device might perform a measurement of the received message. This provides a measure of the signal power received. Based on this measure a set criterion associated to the received signal power is used to extract those messages whose content might be useful for planning scheduling of upcoming communications.

Another possible embodiment provides a method wherein the step S2 of obtaining a measure further comprises to obtain a measure of the transmit power and/or the beam forming gain of the signal corresponding to the received message.

The measure might in cases where the transmit power or the beamforming gain, for example, is provided in the resource reservation message, correspond to information provided in the message and thus obtained from the message. The measure might therefore in general be obtained through either an active measurement performed by the wireless device or through information provided to the wireless device through the decoded resource reservation message.

In an exemplary embodiment of the proposed technology there is provided a method wherein the step S2 of obtaining a measure also comprises to generate an estimate of the path gain or the path loss between the transmitting wireless device and the wireless device based on the obtained measures and using said estimate as a measure. Hence, if measures of received signal power for the message and the transmit signal power of the message is obtained, the method generates an estimate of the path gain or the path loss between the transmitting device and the wireless device. This estimate is then considered as a measure to be compared with a set criterion related to the path gain or the path loss.

In a particular embodiment of the described method, the step S3 of determining whether the obtained measure fulfills a specified criteria associated with the obtained measure comprises to compare the obtained measure with a specified criterion that corresponds to a set threshold value associated to the obtained measure.

In an exemplary scenario where the obtained measure comprises a measure of the signal power, either the obtained received signal power or the obtained transmit signal power, of the received message, the threshold value could be set to correspond to an upper value of the signal power. Here the upper value is defined as a value above which a significant interference between signal transmissions is to be expected. Since the proposed method aims to include the information about the reserved communication resource carried by the message in the planning of future transmission if it is expected that the wireless device own future communications will be subject to significant interference from the communication in the reserved communication resource, the method will include the information carried by the received and decoded message if the obtained measure exceed the set threshold value. In this way it is ensured that the information most relevant is in included when planning scheduling of upcoming communications. That is, information about future transmissions that might negatively affect the wireless device communications by means of for example potential interferences.

In an exemplary embodiment of the proposed method, where the measure comprises an estimate of the path gain, the step S4 of deciding whether to include the information when performing planning of scheduling of upcoming communications comprises to include said information if it is determined in step S3 that the estimate of the path gain exceed the set threshold value.

An alternative scenario relates to the case where the obtained measure comprises a measure of the path loss between the transmitting wireless device and the wireless device that receives and decodes the message. In this case the threshold could be set to represent a lower value for the estimated path loss whereby the method will strive to include the information in the resource reservation message if the estimated path loss is below the set threshold value. In other words, in order to handle the described scenario where the measure is associated to path loss, there is provided a method where the measure comprises an estimate of the path loss, and where the step S4 of deciding whether to include the information when performing planning of scheduling of upcoming communications comprises to include the information if it is determined in step S3 that the estimate of the path loss is below the set threshold value.

Certain exemplary embodiment of the proposed technology provides threshold values as specific criteria for determining whether the obtained measure of the signal characteristic have a value that renders the information carried by the message interesting to include in the wireless device local view of the communication resource utilization. In specific alternatives of the proposed method is the threshold value set in order to optimize any of the following specifics or any combination of the following specifics:

the spatial reuse in the network comprising the wireless device;

the fairness in the network comprising the wireless device;

the sum-system throughput in the network comprising the wireless device.

In other words, in one potential embodiment is the threshold set so that the spatial reuse in the system is optimized. In another embodiment is the threshold is set to optimize fairness in the system. And in yet another embodiment, is the threshold is set to maximize the sum-system throughput. Other versions of embodiments are possible for example where other system performance indicators considered relevant to the service that is aimed to be provided are used to set a suitable threshold/threshold value.

According to an optional embodiment is it possible to set the thresholds individually for each wireless device. This could for example be done in order to meet individual constraints, such as a hardware capability, relevant to specific wireless devices. The thresholds could also be set commonly for different types of wireless devices, e.g. a User Equipment, UE, an Access Node, AN, etc. It might, in still another embodiment, be possible to set the thresholds differently for different type of communications. For example downlink, uplink, machine to machine—M2M, device to device—D2D, etc. The thresholds could also be set differently for different types of traffic. This could even be done for different traffic within the same wireless device.

An alternative embodiment of the proposed technology provides a method where the step S2 of obtaining a measure comprises to obtain a signaling direction between the transmitting wireless device and the wireless device, and where the step S3 of determining whether the obtained measure fulfills a specified criterion comprises to determine whether the obtained signaling direction coincides with the signaling direction of an upcoming communication and wherein the step S4 of deciding whether to include the information comprises to exclude a particular upcoming communication from the scheduling of upcoming communications if said obtained signaling direction essentially coincides with the signaling direction of the particular upcoming communication.

In other words, the method utilizes as criterion a signaling direction between the transmitting device 20 and the wireless device 10. By obtaining a signaling direction between the devices it will be possible to determine whether future communications, such as future transmissions from the wireless device 10 will be interfered by a transmission from the wireless device 20. In this way it will be possible to include the information from a certain message in the planning of scheduling of upcoming communications if the message emanated from a transmitting wireless device whose signaling direction with the wireless device 10 more or less coincides with the signaling direction of a potential transmission from the wireless device. Hence a transmitting wireless device 20 that transmits with a rather low signal strength might still interfere with future communications if the signaling directions coincides. Conversely a message from a transmitting wireless device 20 that transmits with rather large signal power can be excluded from the process if the signaling directions do not have a substantial overlap. This embodiment might be advantageous in certain propagation environments where directive transmissions, e.g., pencil beam forming, is used. That is when the message is transmitted in a narrow beam in contrast to an omni-directional transmission where the transmission is performed over all directions or quasi-omni-directional transmissions which are directional transmissions but with sweeping over a large area by a set of repeated transmissions.

Put slightly differently, in technologies with higher frequencies and pencil beamforming/narrow high gain beamforming, interference is considered less important in the sense that a particular signal characteristics, such as Signal to Interference to Noise Ratio, SINR, will in most cases be very high for the communication link. In this case, when two pairs of wireless devices are transmitting at the same time in a system using omnidirectional transmission, a strong interference on other users may follow. As a contrast to this, the use of narrow or pencil beamforming may instead allow for equal time communications without exhibiting any significant interference.

In a particular embodiment of the proposed technology there is provided a method where the communication channel over which the message was received comprises a frequency channel dedicated to resource reservation negotiations. The proposed method might in particular be useful for wireless devices in contention based Radio Access Technologies, RATs, that utilizes contention based access schemes.

Figure 7:
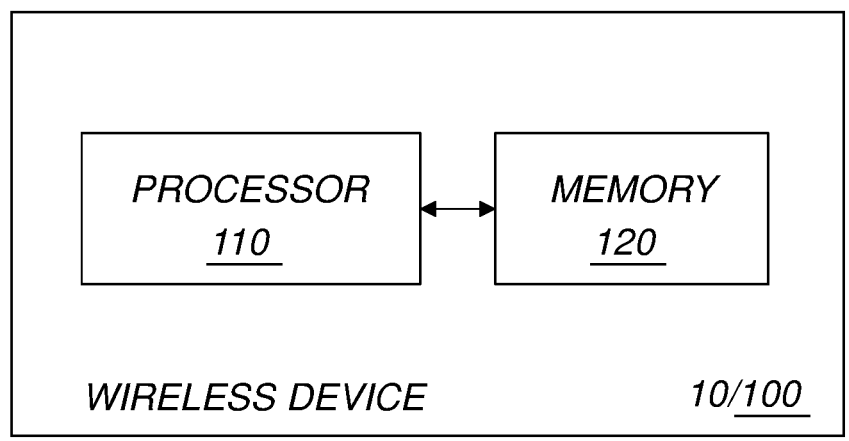
FIG. 7 is a block diagram illustrating an exemplary embodiment of a wireless device according to the proposed technology.

The proposed technology also provides a wireless device that is configured to perform the described method. As such it provides a wireless device 10; 15 that is configured to work in a wireless communication network. The wireless device 10; 15 is configured to decode a message received on a communication channel used for resource reservation negotiations, the received message comprising information relating to reservations of communication resources to be used between a transmitting wireless device and an intended recipient. The wireless device is also configured to obtain a measure of a signal characteristic of the received message. The wireless device 10; 15 is also configured to determine if the obtained measure fulfills a specified criterion. The wireless device 10; 15 is also configured to decide, based on whether the obtained measure fulfilled the specified criterion, whether to include the information relating to reservations of communication resources to be used when planning scheduling of upcoming communications. FIG. 7 is a schematic block diagram that illustrates a particular wireless device according to the proposed technology.

In a particular embodiment of the wireless device 10; 15 the information relating to reservations of communication resources to be used between a transmitting wireless device and an intended receiving wireless device comprises information relating to reservations of time and frequency resources.

In an alternative embodiment of the wireless device 10; 15, is the wireless device 10; 15 configured to establish whether the wireless device was the intended recipient of the message, and configured to determine if the obtained measure fulfills a specified criterion only if it is established that the wireless device was not the intended recipient of the message By way of example, in one embodiment of the wireless device 10; 1 the wireless device 10; 15 is configured to establish whether the wireless device was the intended recipient of the received message, in the case that resource reservation message is a message requesting a resource reservation, based on information identifying the intended recipient of the message where the information is contained in the received message.

In still another embodiment is the wireless device 10; 15 configured to obtain a measure of a signal characteristic that is a measure of the received signal power of the received message.

Yet another embodiment of the wireless device 10; 15 provides a wireless device 10; 15 that is also configured to obtain a measure of the transmit power and/or the beam forming gain of the signal corresponding to the received message.

A possible embodiment of the wireless device 10; 15 provides a wireless device 10; 15 that is configured to generate an estimate of the path gain or the path loss between the transmitting wireless device and the receiving wireless device based on the obtained measures and using said estimate as a measure.

A particular example of a wireless device 10; 15 provides a wireless device 10; 15 that is configured to determine whether the obtained measure fulfills a specified criterion associated with the obtained measure by comparing said obtained measure with a specified criterion that corresponds to a set threshold value associated to said obtained measure.

According to an exemplary embodiment of a wireless device 10; 15, where the obtained measure comprises an estimate of the path gain, the wireless device 10; 15 is configured to decide whether to include the information when performing planning of scheduling of upcoming communications and configured to include the information if it is determined that the estimate of the path gain exceed the set threshold value.

In another exemplary embodiment of a wireless device 10; 15, where the measure comprises an estimate of the path loss, the wireless device 10; 15 is configured to decide whether to include the information when performing planning of scheduling of upcoming communications and configured to include the information if it is determined that the estimate of the path loss is below the set threshold value.

In optional embodiments of the wireless device 10; 15 the wireless device 10; 15 is configured to use a threshold value that is set in order to optimize any of the following specifics or any combination of the following specifics:

the spatial reuse in the network comprising the wireless device;

the fairness in the network comprising the wireless device;

the sum-system throughput in the network comprising the wireless device.

In an alternative embodiment of the wireless device 10; 15 the wireless device 10; 15 is configured to obtain a measure that comprises a signaling direction between the transmitting wireless device and the wireless device. In this embodiment is the wireless device 10; 15 also configured to determine whether the obtained measure fulfills a specified criterion by determining whether the obtained signaling direction coincides with the signaling direction of an upcoming communication. The wireless device 10; 15 is also configured to decide whether to include the information by excluding a particular upcoming communication from the scheduling of upcoming communications if the obtained signaling direction essentially coincides with the signaling direction of the particular upcoming communication.

In an optional embodiment of the wireless device 10; 15, the communication channel over which the message is received comprises a frequency channel dedicated to resource reservation negotiations.

FIG. 7 provides an illustration, in block diagram form, of the wireless device 10; 15. The wireless device 10; 15 comprises a processor 110 and a memory 120, the memory 120 comprising instructions, which when executed on the processor 110 cause the processor 110 to operate the wireless device.

Optionally, the wireless device may also include communication circuitry. The communication circuitry may include functions for wired and/or wireless communication with other devices and/or network nodes in the network. In a particular example, the wireless device, UE, network node may include radio circuitry for communication with one or more other nodes, including transmitting and/or receiving information. The communication circuitry may be interconnected to the processor and/or memory.

Figure 8:
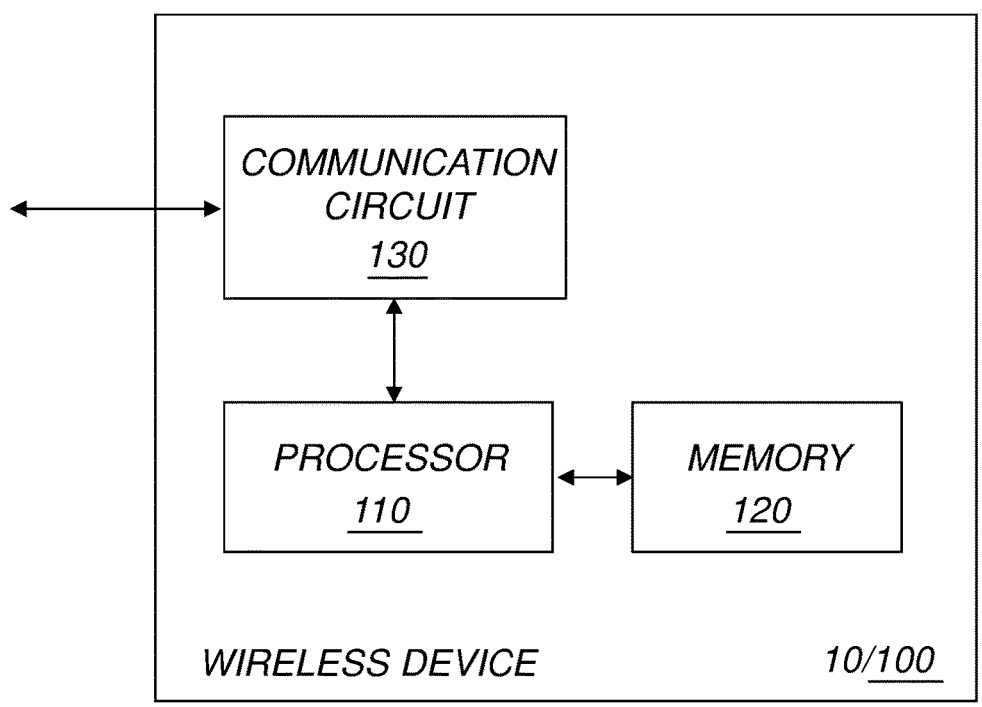
FIG. 8 is a block diagram illustrating an exemplary embodiment of a wireless device according to the proposed technology.

FIG. 8 illustrates through block diagrams a wireless device, where the wireless device also comprises communication circuitry 130.

The proposed wireless device might in particular be configured to work in a contention based Radio Access Technologies, RATs, that utilizes contention based access schemes.

Having described certain embodiments of a proposed method and a corresponding wireless device a few non-limiting examples will be given. The examples are given with the mere intention to facilitate the understanding of the proposed technology and should not in any way be construed as limiting.

We begin by providing some examples of how the proposed technology might be used in an mmW RAT system. That is, in a Radio Access Technology system that utilizes millimeter waves. For an mmW RAT system the medium access control, MAC, behavior is proposed to be contention based. In this MAC is each node or wireless device responsible for allocating communication resources with a RTS/CTS like procedure that is carried out at a dedicated communication resource. The messages exchanged between nodes or wireless devices aiming to set up a communication link are, in one particular simple implementation, reference is here made to FIG. 1:

A resource reservation message is sent by a first node, such as a first wireless device 20, to a second node, such as a second wireless device 30, to propose a set of communication resources, for example the frequency channel (subcarrier(s)) to be used and the time of the communication. An RC message—resource confirmation message—could be sent back from the second wireless device 30 to the first wireless device 20, whereby the wireless device 30 accepts the proposed resources to use for the communication. If no RC message is received at the first wireless device 20, the first wireless device 20 might decide that there will be no communication with the requested communication resource.

Other nearby nodes, such as nearby wireless devices that overhear the resource reservation messages and the RC messages may use the relevant information contained in the messages in order to plan upcoming communications. Each communicating node or wireless device 10; 20 within the network keeps a record of its local view on the upcoming communication resource utilization. Based on this local view a communication node, such as a wireless device 10; 20, may plan its own upcoming communication transmissions in such a way that the communication is expected to be successful.

The second wireless device 30 may use its local view of the communication resource utilization to decide if a proposal from the first node will be accepted and reply by a RC message, or rejected (e.g., by sending no reply to the resource reservation message).

The resource reservation messages are transmitted in such way that they can provide sufficient coverage and reach the receiver nodes, as well as neighboring nodes to allow them to clear the channel from transmission. Thus, by design, the messages will be overheard by several nodes that will all agree on who is allowed to transmit at a given time, reducing the spectral reuse for better channel quality.

In this particular example the proposed technology introduces a threshold that can be used to decide if the content of a resource reservation message should be considered (included) in the local view of the resource utilization. A local view of the resource utilization is kept by all nodes and may be used for planning future transmissions. The threshold used according to the example should be applied to particular resource reservation messages received at a wireless device 10. In a possible version the threshold will only be used if the receiving wireless device was not the intended recipient of the message.

The threshold could be dynamically adjusted to properly account for the propagation environment and the available beamforming capabilities of the communicating nodes/wireless devices within the network.

Particular thresholds, or equivalently threshold values, could be compared with various types of measures obtained from the resource reservation messages, for example the received power of the resource reservation message, the path loss between the transmitter and the receiver, the Signal to Interference and Noise Ratio, SINR of the received resource reservation message, the ratio between the resource reservation message power and some other signal power characteristics The threshold/threshold values could also be set to different values or be based on different criteria for different nodes/wireless devices within in the system. The threshold could, for example, be set individually for each wireless device within the network, or be based on the type of wireless device, or the type of communication, for example the communication type, that is whether the communication is performed between, for example, different User Equipment's, UEs, or different Access Nodes, ANs.

In a particular embodiment the threshold could be implemented as a Signal to Interference and Noise Ratio, SINR, threshold. If a resource reservation message is received and properly decoded by a receiving wireless device, and displays an SINR value below the threshold the resource reservation message will not be included in the local view of the receiving node. On the other hand if the received resource reservation message has an SINR value which is above the threshold the information is included and considered in the local view of the communication resource usage of the receiving wireless device.

If the message is not considered by the node it means that the interference caused by the announced communication by the resource reservation message might, with a substantial likelihood, not cause any significant interference to any potential upcoming concurrent transmissions performed by the receiving wireless device.

We proceed by providing a concrete example of an embodiment that extracts information relevant for planning scheduling of upcoming communications, reference is made to FIG. 1. The example relates to a transmitting wireless device 20 that transmits a resource reservation message to a wireless device 30 over a radio communication channel that is used for resource reservation negotiations. This message is overheard by a wireless device 10. The exemplary decision procedure outlined below is performed by the wireless device 10.

At first a resource reservation message is decoded. The resource reservation message contains information on the destination of the upcoming communication to which the resource reservation message relates.

If the wireless device 10 concludes that the destination, or intended recipient of the resource reservation message is the wireless device 10 itself, the wireless device will include the information carried by the resource reservation according to common procedures and may end the decision procedure.

If on the other hand the wireless device concludes that the intended recipient of the resource reservation message is another wireless device, in this case the wireless 30, than the procedure continues.

The wireless device 10 may for example measure the received signal power of the resource reservation message. The resource reservation message may further contain information on the transmit power used by the transmitting wireless device 20 when the message was transmitted. Alternatively the content of the message may allow the wireless device 10 to use a measure in the form of a transmit beamforming gain. The measurement provides as such a means whereby an estimation of the path gain between the transmitting wireless device 20 and the wireless device 10 can be obtained. The obtained estimate could possibly include interference and as such it would be an estimate of the path gain including interference.

That is, a possible estimate might be obtained through the following equation, in logarithmic scale:

Estimate, E=Path gain+Interference signal strength=Measured signal strength−transmit power−transmit beamforming gain−receiver beamforming gain in the arrival direction of the resource reservation message.

Finally the obtained or derived estimate, E, is compared with a pre-set threshold value. If the obtained or derived estimate is below the threshold the information comprised in the resource reservation message will not be included in the planning of scheduling of upcoming communications to be performed by the wireless device 10.

The proposed technology also provides a complementary method that will simplify certain embodiments related to the earlier described method for operating a wireless device. Certain embodiments of the latter method utilized information about the identity of the intended recipient of the resource reservation message in order to only process those messages that were not intended for the wireless device itself. Yet other embodiments utilized information about the signaling condition on the side of the wireless device transmitting the resource reservation message. This in order to be able to, for example, estimate the path gain or the path loss of the signal on its way from the transmitting wireless device to the wireless device.

It would be beneficial if the above mentioned information could be extracted by the wireless device with as little effort as possible, in order to achieve this goal the proposed technology provides a method that could act as complement to the earlier described method.

One particular embodiment of such a method provides a method performed by a wireless device, configured to work in a wireless communication system, for transmitting resource reservation messages. The method comprises the step of creating S10 a resource reservation message comprising a request to reserve communication resources for an upcoming transmission. The method also comprises the step of adding S20, to the resource reservation message, information identifying the intended receiver of the resource reservation message to enable a third party overhearing the message to use the information comprised in the resource reservation message when planning scheduling of upcoming communications. The method also comprises the step of transmitting S30 the resource reservation message with the included information identifying the intended receiver over a communication channel used for resource reservation negotiations.

In this way the wireless device that receives and decode the resource reservation message will be provided with information about the identity of the intended recipient of the message. The receiving device can therefore directly exclude certain messages from the procedure of determining whether the information comprised in the message should be included when planning scheduling of upcoming communications.

Another possible embodiment provides for a method that also comprises to incorporate, into the resource reservation message, information about the signal power used when transmitting the resource reservation message and/or information about the antenna gain at the transmitter to enable an estimation of the signal power loss between the transmitter and the third party overhearing the message.

By adding this information to the message a third party wireless device overhearing the message on the communication channel might make a measurement of the received signal power, this measurement together with the included information enables the wireless device to generate an estimate of the path gain or the path loss of the signal on its way from the transmitting wireless device to the wireless device receiving and decoding the message.

The proposed method might in particular be useful for wireless devices in contention based Radio Access Technologies, RATs, that utilizes contention based access schemes.

The proposed technology also provides a wireless device configured to perform the method. FIG. 7 and FIG. 8 provides an illustration of such a wireless device in block diagram form.

According to a particular embodiment it is provided a wireless device 100; 105, configured to work in a wireless communication network. The wireless device 100; 105 is configured to create a resource reservation message comprising a request to reserve resources for an upcoming transmission. The wireless device 100; 105 is also configured to add, to the resource reservation request message, information identifying the intended recipient of the resource reservation request message to enable a third party to use the content of the message when planning scheduling of upcoming communications. The wireless device 100; 105 is also configured to transmit the resource reservation message with the included information identifying the intended recipient over a communication channel used for resource reservation negotiations.

Still another embodiment provides a wireless device 100; 105 where the wireless device 100; 105 is also configured to incorporate, into the resource reservation request message, information about the signal power used when transmitting the resource reservation message and/or information about the antenna gain at the transmitter to enable an estimation of the signal power loss between the transmitter and the third party overhearing the message In particular embodiments the wireless device 100; 105, comprises a processor 110 and a memory 120, the memory 120 comprising instructions, which when executed on the processor 110 cause the processor 110 to generate a resource reservation request message to be transmitted to enable the scheduling of upcoming communications Optionally, the wireless device may also include communication circuitry. The communication circuitry may include functions for wired and/or wireless communication with other devices and/or network nodes in the network. In a particular example, the wireless device, UE, network node may include radio circuitry for communication with one or more other nodes, including transmitting and/or receiving information. The communication circuitry may be interconnected to the processor and/or memory.

Such an embodiment is schematically illustrated in FIG. 8 which shows a wireless device 100; 105, where the wireless device 100; 105 also comprises communication circuitry 130.

The proposed wireless device might in particular be configured to work in contention based Radio Access Technologies, RATs, that utilizes contention based access schemes.

As used herein, the non-limiting term "wireless device" may refer to any User Equipment, UE, such as a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "wireless device" should be interpreted as non-limiting terms comprising any type of device communicating with a radio network node in a cellular or mobile communication system or any device equipped with radio circuitry for wireless communication according to any relevant standard for communication within a cellular or mobile communication system. The term wireless device may also refer to a radio network node such as a radio base station, for example a Node B, or an evolved Node B, eNBs, and also macro/micro/pico radio base stations, home base stations, also known as femto base stations, or even an access node, such as a radio access point.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

In particular examples, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The proposed technology provides such a computer program 140 comprising instructions, which when executed by at least one processor, cause the at least one processor to:
  decode a message received on a communication channel used for resource reservation negotiations, the received message comprising information relating to reservations of communication resources between a transmitting wireless device and a recipient;
  obtain a measure of a signal characteristic of the received message;
  determine if the obtained measure fulfills a specified criterion;
  decide, based on the comparison of the obtained measure with the specified criterion, whether to include information relating to reservations of communication resources when planning scheduling of upcoming communications.

Figure 9:
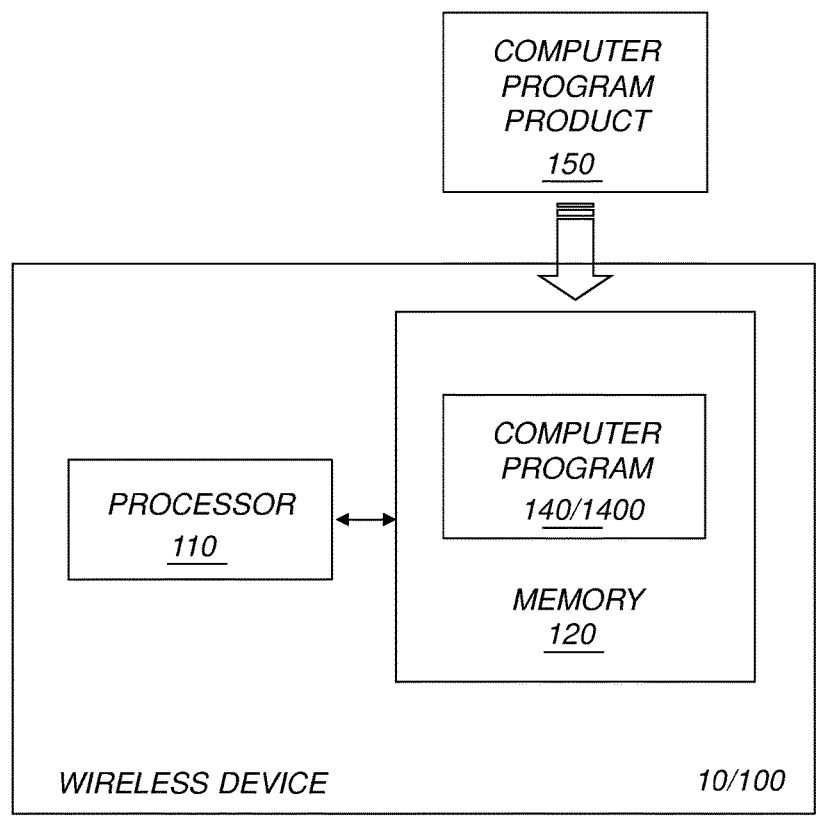
FIG. 9 is a schematic block diagram illustrating an exemplary embodiment of a wireless device according to the proposed technology where a computer program product according to the present invention is used.

The use of such a computer program in a wireless device is illustrated in block diagram form in FIG. 9.

The proposed technology also provides a computer program 1400 comprising instructions, which when executed by at least one processor, cause the at least one processor to:
  create a resource reservation message comprising a request to reserve resources for an upcoming transmission; and
  add, to the resource reservation message, information identifying the intended recipient of the resource reservation request message to enable a third party to use the content of the message when planning scheduling of upcoming communications to thereby enable a resource reservation message with the included information identifying the intended recipient to be transmitted over a communication channel used for resource reservation negotiations.

The use of such a computer program in a wireless device is illustrated in block diagram form in FIG. 9.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The proposed technology also provides a computer program product 150 comprising a computer-readable storage medium having stored thereon the computer program.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be used for only execute the above-described steps, functions, procedure and/or blocks, but may also execute other tasks.

The flow diagram or diagrams presented herein may be regarded as a computer flow diagram or diagrams, when performed by one or more processors. A corresponding wireless device may be defined as a group of function modules, where each step performed by the processor corresponds to a function module. In this case, the function modules are implemented as a computer program running on the processor. Hence, the wireless device may alternatively be defined as a group of function modules, where the function modules are implemented as a computer program running on at least one processor.

Figure 10:
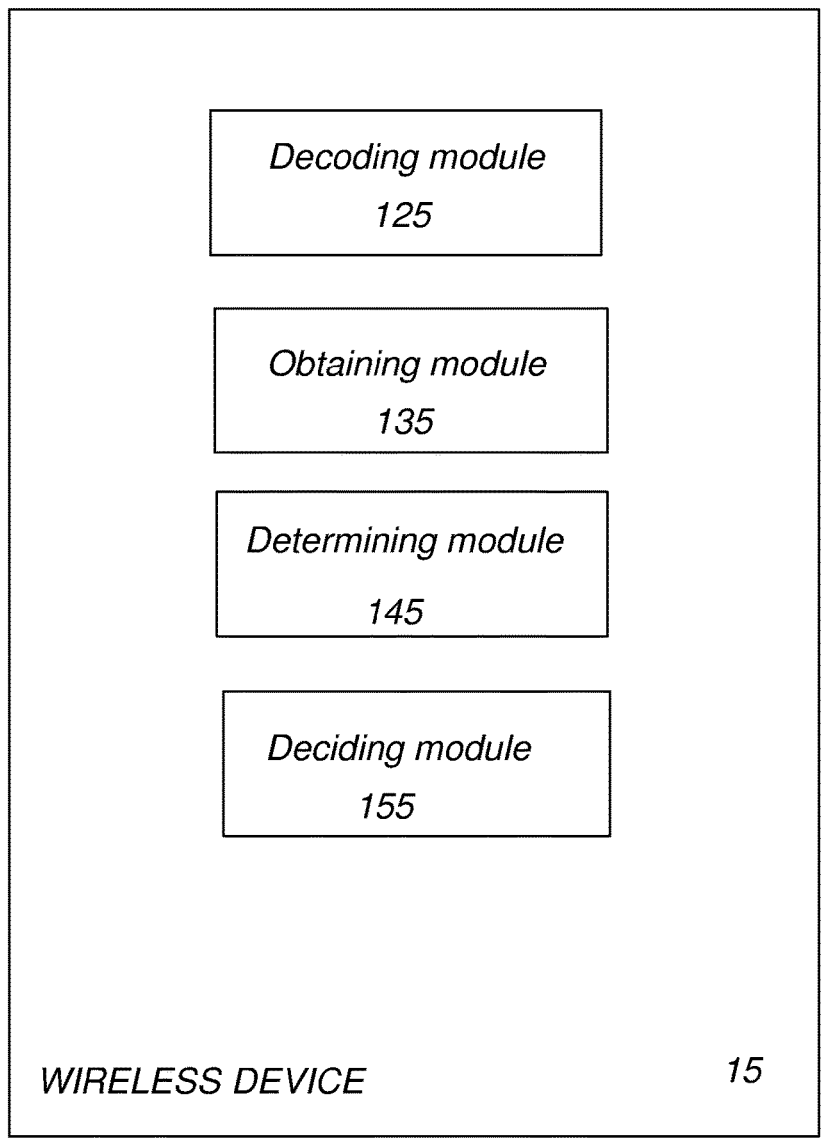
FIG. 10 is a schematic block diagram illustrating an example of a wireless device according to an embodiment.

FIG. 10 provides a schematic illustration of d a wireless device 15 configured to work in a wireless communication network. The wireless device 15 comprises:
- a decoding module 125 for decoding a resource reservation message received on a communication channel used for resource reservation negotiations, the received message comprising information relating to reservations of communication resources to be used between a transmitting wireless device and a recipient;
- an obtaining module 135 for obtaining a measure of a signal characteristic of the received message;
- a determining module 145 for determining whether the obtained measure fulfills a specified criterion;
- a deciding module 155 for deciding, based on whether the obtained measure fulfilled the specified criterion, whether to include the information relating to reservations of communication resources to be used when planning scheduling of upcoming communications.

Figure 11:
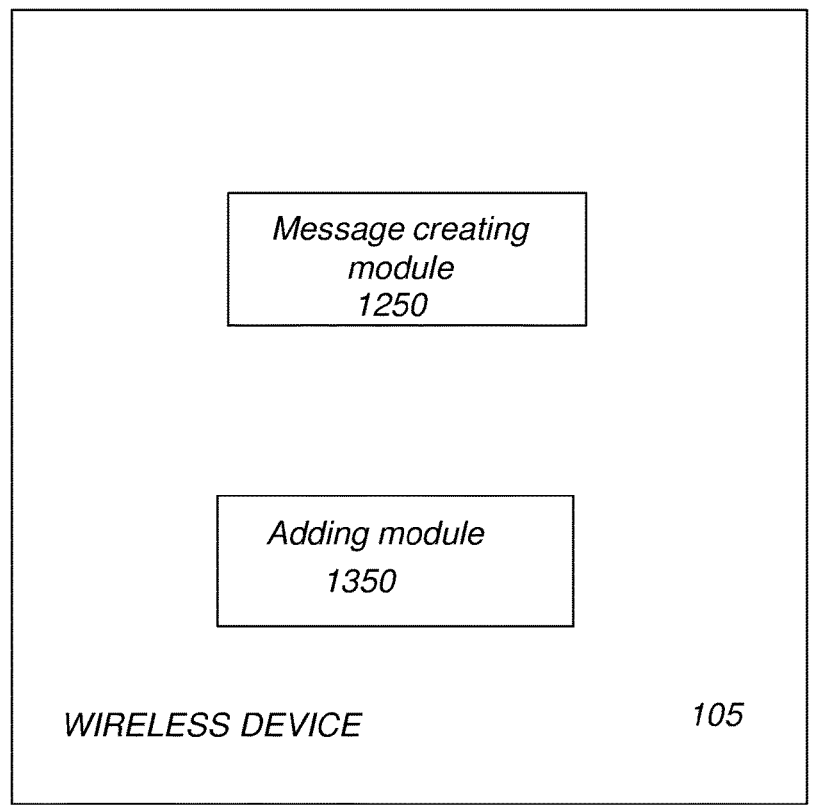
FIG. 11 is a schematic block diagram illustrating an example of a wireless device according to an embodiment.

FIG. 11 provides a schematic illustration of a wireless device 105, configured to work in a wireless communication network. The wireless device 105 comprises:
- a message creating module 1250 for creating a resource reservation message comprising a request to reserve communication resources for an upcoming transmission and for adding, to the resource reservation message, information identifying the intended receiver of the resource reservation message to enable a third party overhearing the message to use the information comprised in the resource reservation message when planning scheduling of upcoming communications;
- an output module 1350 for outputting the resource reservation message with the added information identifying the intended receiver over a communication channel used for resource reservation negotiations.

The computer program residing in memory may thus be organized as appropriate function modules configured to perform, when executed by the processor, at least part of the steps and/or tasks described herein. Alternatively it is possibly to realize the modules in FIGS. 10 and 11 predominantly by hardware modules, or alternatively by hardware. The extent of software versus hardware is purely implementation selection.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for operating a first wireless device, the method comprising:
   decoding a resource reservation message received on a communication channel used for resource reservation negotiations, the received resource reservation message comprising information relating to reservations of communication resources between a second transmitting wireless device and a third receiving wireless device;
   obtaining a measure of a signal characteristic of the received resource reservation message;
   determining if the obtained measure fulfills a specified criterion; and
   deciding, based on whether the obtained measure fulfilled the specified criterion, whether to include the information relating to reservations of communication resources when planning scheduling of the first wireless device's upcoming communications, wherein deciding whether to include the information comprises excluding the information in the resource reservation message when planning the scheduling of the first wireless device's upcoming communications.

2. The method of claim 1, wherein the information comprises information relating to reservations about time and frequency resources.

3. The method of claim 1:
   further comprising establishing whether the first wireless device was an intended recipient of the resource reservation message; and
   wherein the determining is performed only if it is established that the first wireless device was not the intended recipient of the resource reservation message.

4. The method of claim 1, wherein the obtaining the measure of the signal characteristic comprises obtaining a measure of a received signal power of the received resource reservation message.

5. The method of claim 4, wherein the obtaining the measure of the signal characteristic further comprises obtaining a measure of a transmit power and/or a beam forming gain of a signal corresponding to the received resource reservation message.

6. The method of claim 5, wherein the obtaining the measure of the signal characteristic further comprises:

generating an estimate of a path gain or a path loss between the second transmitting wireless device and the first wireless device based on the obtained measures; and using the estimate as a measure.

7. The method of claim 1, wherein the determining whether the obtained measure fulfills the specified criterion comprises comparing the obtained measure with a specified criterion that corresponds to a set threshold value associated with the obtained measure.

8. The method of claim 7:
wherein the obtained measure comprises an estimate of a path gain; and
wherein the deciding whether to include the information when performing planning of the scheduling of upcoming communications comprises including the information if it is determined that the estimate of the path gain exceeds the set threshold value.

9. The method of claim 7:
wherein the obtained measure comprises an estimate of a path loss; and
wherein the deciding whether to include the information when performing planning of the scheduling of upcoming communications comprises including the information if it is determined that the estimate of the path loss is below the set threshold value.

10. The method of claim 7, wherein the threshold value is set in order to optimize any one or more of the following:
spatial reuse in a network comprising the first wireless device;
fairness in the network comprising the first wireless device; and
sum-system throughput in the network comprising the first wireless device.

11. The method of claim 1:
wherein the obtaining the measure comprises obtaining a signaling direction between the second transmitting wireless device and the first wireless device;
wherein the determining if the obtained measure fulfills the specified criterion comprises determining whether the obtained signaling direction coincides with a signaling direction of an upcoming communication; and
wherein the deciding whether to include the information comprises excluding a particular upcoming communication from the scheduling of upcoming communications if the obtained signaling direction essentially coincides with a signaling direction of the particular upcoming communication.

12. The method of claim 1, wherein the communication channel over which the resource reservation message was received comprises a frequency channel dedicated to resource reservation negotiations.

13. A method, performed by a wireless device configured to work in a wireless communication system, for transmitting resource reservation messages, the method comprising:
creating a resource reservation message comprising a request to reserve communication resources for an upcoming transmission;
adding, to the resource reservation message, information identifying an intended receiver of the resource reservation message to enable a third party wireless device overhearing the resource reservation message to determine whether to use the information comprised in the resource reservation message and exclude the information in the resource reservation message when planning scheduling of the third party wireless device's upcoming communications; and transmitting the resource reservation message with the information identifying the intended receiver over a communication channel used for resource reservation negotiations.

14. The method of claim 13, further comprising incorporating, into the resource reservation message, information about a signal power used when transmitting the resource reservation message and/or information about an antenna gain at a transmitter to enable an estimation of a signal power loss between the transmitter and the third party wireless device overhearing the resource reservation message.

15. A first wireless device configured to work in a wireless communication network, the first wireless device comprising:
processing circuitry; and
memory containing instructions executable by the processing circuitry whereby the first wireless device is operative to:
decode a resource reservation message received on a communication channel used for resource reservation negotiations, the received resource reservation message comprising information relating to reservations of communication resources to be used between a second transmitting wireless device and a third receiving wireless device;
obtain a measure of a signal characteristic of the received resource reservation message;
determine if the obtained measure fulfills a specified criterion;
decide, based on whether the obtained measure fulfilled the specified criterion, whether to include the information relating to reservations of communication resources when planning scheduling of the first wireless device's upcoming communications; and
exclude the information in the resource reservation message when planning the scheduling of the first wireless device's upcoming communications.

16. The first wireless device of claim 15, wherein the information comprises information relating to reservations of time and frequency resources.

17. The first wireless device of claim 15, wherein the instructions are such that the first wireless device is operative to:
establish whether the first wireless device was an intended recipient of the resource reservation message; and
determine if the obtained measure fulfills the specified criterion only if it is established that the first wireless device was not the intended recipient of the resource reservation message.

18. The first wireless device of claim 15, wherein the instructions are such that the first wireless device is operative to obtain a measure of the signal characteristic that is a measure of a received signal power of the received resource reservation message.

19. The first wireless device of claim 18, wherein the instructions are such that the first wireless device is operative to obtain a measure of a transmit power and/or a beam forming gain of a signal corresponding to the received resource reservation message.

20. The first wireless device of claim 19, wherein the instructions are such that the first wireless device is operative to generate an estimate of a path gain or a path loss between the second transmitting wireless device and the first wireless device based on the obtained measures and using the estimate as a measure.

21. The first wireless device of claim 15, wherein the instructions are such that the first wireless device is operative to determine whether the obtained measure fulfills the specified criterion associated with the obtained measure by comparing the obtained measure with a specified criterion that corresponds to a set threshold value associated with the obtained measure.

22. The first wireless device of claim 21:
wherein the obtained measure comprises an estimate of a path gain; and
wherein the instructions are such that the first wireless device is operative to:
decide whether to include the information when performing planning of the scheduling of upcoming communications; and
include the information if it is determined that the estimate of the path gain exceeds the set threshold value.

23. The first wireless device of claim 21:
wherein the obtained measure comprises an estimate of a path loss, and
wherein the instructions are such that the first wireless device is operative to:
decide whether to include the information when performing planning of the scheduling of upcoming communications; and
include the information if it is determined that the estimate of the path loss is below the set threshold value.

24. The first wireless device of claim 21, wherein the instructions are such that the first wireless device is operative to use the threshold value that is set in order to optimize any of the following specifics or any combination of the following specifics:
spatial reuse in the wireless communication network comprising the first wireless device;
fairness in the wireless communication network comprising the first wireless device; and
sum-system throughput in the wireless communication network comprising the first wireless device.

25. The first wireless device of claim 15, wherein the instructions are such that the first wireless device is operative to:
obtain a measure that comprises a signaling direction between the second transmitting wireless device and the first wireless device;
determine if the obtained measure fulfills the specified criterion by determining whether the obtained signaling direction coincides with a signaling direction of an upcoming communication; and
decide whether to include the information by excluding a particular upcoming communication from the scheduling of upcoming communications if the obtained signaling direction essentially coincides with a signaling direction of the particular upcoming communication.

26. The first wireless device of claim 15, wherein the communication channel over which the resource reservation message was received comprises a frequency channel dedicated to resource reservation negotiations.

27. A first wireless device configured to work in a wireless communication network, the first wireless device comprising:
processing circuitry; and
memory containing instructions executable by the processing circuitry whereby the first wireless device is operative to:
create a resource reservation message comprising a request to reserve communication resources for an upcoming transmission;
add, to the resource reservation message, information identifying an intended receiver of the resource reservation message to enable a third party wireless device overhearing the resource reservation message to determine whether to use the information comprised in the resource reservation message and exclude the information in the resource reservation message when planning scheduling of the third party wireless device's upcoming communications; and
transmit the resource reservation message with the included information identifying the intended recipient over a communication channel used for resource reservation negotiations.

28. The first wireless device of claim 27, wherein the instructions are such that the first wireless device is operative to incorporate, into the resource reservation request message, information about a signal power used when transmitting the resource reservation message and/or information about an antenna gain at a transmitter to enable an estimation of a signal power loss between the transmitter and the third party wireless device overhearing the resource reservation message.

29. A non-transitory computer readable recording medium storing a computer program product for controlling a first wireless device, the computer program product comprising software instructions which, when run on processing circuitry of the first wireless device, causes the first wireless device to:
decode a resource reservation message received on a communication channel used for resource reservation negotiations, the received resource reservation message comprising information relating to reservations of communication resources to be used between a second transmitting wireless device and a third receiving wireless device;
obtain a measure of a signal characteristic of the received resource reservation message;
determine if the obtained measure fulfills a specified criterion;
decide, based on a comparison of the obtained measure with the specified criterion, whether to include the information relating to reservations of communication resources and to exclude the information in the resource reservation message when planning scheduling of upcoming communications.

30. A non-transitory computer readable recording medium storing a computer program product for controlling a wireless device, the computer program product comprising software instructions which, when run on processing circuitry of the wireless device, causes the wireless device to:
create a resource reservation message comprising a request to reserve resources for an upcoming transmission; and
add, to the resource reservation message, information identifying an intended receiver of the resource reservation message to enable a third party wireless device overhearing the resource reservation message to determine whether to use the information comprised in the resource reservation message and exclude the information in the resource reservation message when planning scheduling of the third party wireless device's upcoming communications to thereby enable the resource reservation message with the included information identifying the intended recipient to be transmitted over a communication channel used for resource reservation negotiations.

\* \* \* \* \*